(12) United States Patent
Zhang et al.

(10) Patent No.: US 12,411,742 B2
(45) Date of Patent: Sep. 9, 2025

(54) METHOD, ELECTRONIC DEVICE, AND COMPUTER PROGRAM PRODUCT FOR RECOVERING DATA

(71) Applicant: Dell Products L. P., Round Rock, TX (US)

(72) Inventors: Ming Zhang, Beijing (CN); Chen Gong, Beijing (CN); Liangfeng Zhu, Beijing (CN); Jian Liu, Beijing (CN)

(73) Assignee: Dell Products L.P., Round Rock, TX (US)

( * ) Notice: Subject to any disclaimer, the term of this patent is extended or adjusted under 35 U.S.C. 154(b) by 33 days.

(21) Appl. No.: 18/615,029

(22) Filed: Mar. 25, 2024

(65) Prior Publication Data

US 2025/0094292 A1    Mar. 20, 2025

(30) Foreign Application Priority Data

Sep. 18, 2023    (CN) .......................... 202311206273.7

(51) Int. Cl.
*G06F 11/14*    (2006.01)

(52) U.S. Cl.
CPC .... *G06F 11/1469* (2013.01); *G06F 2201/805* (2013.01)

(58) Field of Classification Search
CPC .. G06F 11/14; G06F 11/1446; G06F 11/1451; G06F 11/1469; G06F 12/0246; G06F 12/0866; G06F 12/0868; G06F 12/0871; G06F 12/0877; G06F 12/0888; G06F 12/0893; G06F 12/12; G06F 12/122; G06F 12/123; G06F 12/172; G06F 16/122; G06F 16/137; G06F 16/172; G06F 16/1844; G06F 2212/22; G06F 2212/6046; G06F 2201/805
See application file for complete search history.

(56) References Cited

U.S. PATENT DOCUMENTS

| 9,026,499 B1 | 5/2015 | Rajimwale et al. |
| 9,928,002 B2 | 3/2018 | Kumarasamy et al. |

(Continued)

OTHER PUBLICATIONS

Zhang, Weibing, et al.; "Method, Device, and Computer Program Product for Recovering Data," U.S. Appl. No. 18/618,332, filed Mar. 27, 2024.

*Primary Examiner* — Robert W Beausoliel, Jr.
*Assistant Examiner* — Cheryl M Shechtman
(74) *Attorney, Agent, or Firm* — BainwoodHuang

(57) ABSTRACT

Techniques for recovering data involve determining, in response to a request of user equipment, at least one storage block to be recovered under the request, wherein the at least one storage block is composed of storage regions. Such techniques further involve acquiring a cache type of the at least one storage block in a buffer, wherein the cache type is based on the number of recovery regions indicated by the buffer for the at least one storage block. Such techniques further involve determining, based on the cache type, cache regions from regions composing the at least one storage block. Such techniques further involve updating recovery data in the cache regions to the buffer. Such techniques further involve recovering, in response to a recovery confirmation operation, data of the at least one storage block in the user equipment based on the recovery data cached in the buffer after the update.

20 Claims, 7 Drawing Sheets

(56) References Cited

U.S. PATENT DOCUMENTS

| | | | |
|---|---|---|---|
| 9,990,253 B1 | 6/2018 | Rajimwale et al. | |
| 10,719,307 B2 | 7/2020 | Kanada et al. | |
| 11,086,826 B2 | 8/2021 | Thummala et al. | |
| 11,245,420 B2 | 2/2022 | Kim et al. | |
| 11,321,195 B2 | 5/2022 | Dhatrak | |
| 2014/0115257 A1* | 4/2014 | Dundas | G06F 12/0862 711/125 |
| 2014/0223106 A1* | 8/2014 | Shivashankaraiah | G06F 12/122 711/136 |
| 2015/0154078 A1* | 6/2015 | Dutch | G06F 11/1451 707/640 |
| 2018/0300086 A1* | 10/2018 | Han | G06F 3/0632 |
| 2025/0028646 A1* | 1/2025 | Yang | G06F 12/123 |

\* cited by examiner

METHOD, ELECTRONIC DEVICE, AND COMPUTER PROGRAM PRODUCT FOR RECOVERING DATA

CROSS-REFERENCE TO RELATED APPLICATION

This application claims priority to Chinese Patent Application No. CN202311206273.7, on file at the China National Intellectual Property Administration (CNIPA), having a filing date of Sep. 18, 2023, and having "METHODS, ELECTRONIC DEVICES AND COMPUTER PROGRAM PRODUCTS FOR RECOVERING DATA" as a title, the contents and teachings of which are herein incorporated by reference in their entirety.

TECHNICAL FIELD

Embodiments of the present disclosure relate to the field of computers, and more particularly, to a method, an electronic device, a computer-readable storage medium, and a computer program product for recovering data.

BACKGROUND

In a file system, a data recovery tool is an important component. When user equipment experiences a malfunction such as crash or blue screen, a data recovery tool may modify and recover data in the user equipment to avoid data loss. In the daily work of a file system, data recovery is a commonly used function, and therefore, how to achieve data recovery through a good method is currently an important research field.

Currently, data recovery may usually be achieved through a data backup method. For example, to avoid accidental data loss, a file system typically creates a backup copy of important data (such as a volume and a file), and the backup copy is used for recovering data in the event of a failure.

SUMMARY OF THE INVENTION

According to example embodiments disclosed in the present disclosure, a technical solution for recovering data is provided, which can recover data, after user confirmation, by using a buffer for recovering data, and can improve the memory and space efficiency in the buffer to the maximum extent, thereby providing a good user experience.

In a first aspect of the present disclosure, a method for recovering data is provided. The method may include determining, in response to a target recovery request of user equipment, at least one storage block to be recovered under the target recovery request. The at least one storage block is composed of a plurality of storage regions. The method further includes acquiring a cache type of the at least one storage block in a buffer. The cache type of the at least one storage block is based on the number of recovery regions indicated by the buffer for the at least one storage block. The method further includes determining, based on the cache type of the at least one storage block, a plurality of cache regions from a plurality of regions composing the at least one storage block. The method further includes updating recovery data in the plurality of cache regions to the buffer, and recovering, in response to a recovery confirmation operation, data of the at least one storage block in the user equipment based on the recovery data cached in the buffer after the update.

In a second aspect of the present disclosure, an electronic device is provided. The electronic device includes: a processor; and a memory coupled to the processor and having instructions stored therein, wherein the instructions, when executed by the electronic device, cause the electronic device to perform operations, and the operations may include: determining, in response to a target recovery request of user equipment, at least one storage block to be recovered under the target recovery request. The at least one storage block is composed of a plurality of storage regions. The method further includes acquiring a cache type of the at least one storage block in a buffer. The cache type of the at least one storage block is based on the number of recovery regions indicated by the buffer for the at least one storage block. The method further includes determining, based on the cache type of the at least one storage block, a plurality of cache regions from a plurality of regions composing the at least one storage block. The method further includes updating recovery data in the plurality of cache regions to the buffer, and recovering, in response to a recovery confirmation operation, data of the at least one storage block in the user equipment based on the recovery data cached in the buffer after the update.

In a third aspect of the present disclosure, a computer program product is provided. The computer program product is tangibly stored in a computer-readable medium and includes computer-executable instructions, wherein the computer-executable instructions, when executed, cause a computer to perform the method according to the first aspect of the present disclosure.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which.

DETAILED DESCRIPTION

Figure 1:
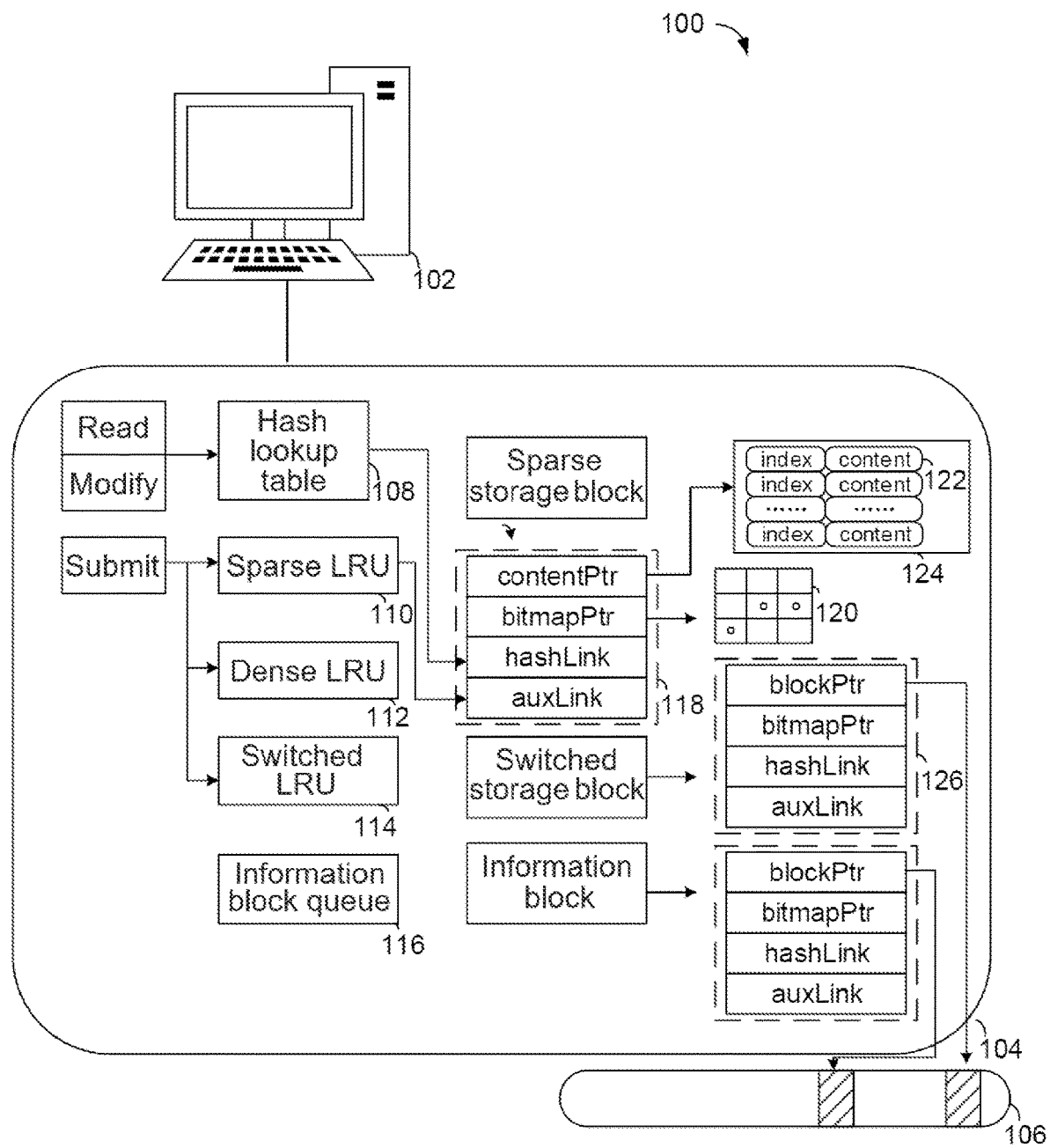
FIG. 1 illustrates an architectural diagram of a data recovery system according to some embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely.

It should be understood that the accompanying drawings and embodiments of the present disclosure are for example purposes only, and are not intended to limit the scope of protection of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In a traditional file system, a recovery tool is usually unidirectional, which means that once any error is detected, the recovery tool will start modifying and repairing the data in user equipment. However, the method of recovery is not flexible enough and does not consider whether a user truly needs to perform these recoveries. For example, in a case of insufficient resources, a user may not need to recover unimportant file data, and the automatic recovery by the recovery tool may actually affect the normal use of the user equipment. Therefore, a more flexible and low-cost data recovery method is currently needed to meet requirements of users.

The present disclosure proposes a method, an electronic device, and a computer program product for recovering data. The method for recovering data may include determining, in response to a target recovery request of user equipment, at least one storage block to be recovered under the target recovery request. The at least one storage block is composed of a plurality of storage regions. The method further includes acquiring a cache type of the at least one storage block in a buffer. The cache type of the at least one storage block is based on the number of recovery regions indicated by the buffer for the at least one storage block. The method further includes determining, based on the cache type of the at least one storage block, a plurality of cache regions from a plurality of regions composing the at least one storage block. The method further includes updating recovery data in the plurality of cache regions to the buffer, and recovering, in response to a recovery confirmation operation, data of the at least one storage block in the user equipment based on the recovery data cached in the buffer after the update. The solution of the embodiments of the present disclosure can recover data, after user confirmation, by using the buffer for recovering data, and can improve the memory and space efficiency in the buffer to the maximum extent, thereby providing a good user experience.

The method proposed in the present disclosure is illustrated below with reference to FIG. 1. An example framework of a data recovery system (also known as a recovery system) 100 is shown in FIG. 1. The recovery system 100 includes user equipment 102, a buffer 104, and an independent logical unit (LUN) 106 associated with the buffer 104. The buffer 104 is used for caching data to be recovered to the user equipment 102 (also known as recovery data), and the LUN 106 is used as a backup memory for the buffer 104. When there is too much data in the buffer 104, the buffer 104 may store the newly added recovery data in the LUN 106 for throttling. When a user performs an operation of confirming the recovery (also known as a recovery confirmation operation), the buffer may recover the data cached therein to the user equipment 102. The present disclosure does not limit types of the user equipment 100, the buffer 104, and the LUN 106. For example, the user equipment 100 may be a mobile phone, a computer, a wearable device, and the like, and the buffer 104 may be a Level-2 cache L2, a Level-3 cache L3, and the like.

In the buffer 104, there are a hash lookup table 108, a sparse least recently used (LRU) queue 110, a dense LRU queue 112, a switched LRU queue 114, and an information block queue 116. The sparse LRU queue 110, the dense LRU queue 112, and the switched LRU queue 114 are used for caching recovery data of different storage blocks in the user equipment. The hash lookup table 108 is used for searching for corresponding storage blocks in the sparse LRU queue 110, the dense LRU queue 112, and the switched LRU queue 114 according to hashes during reading and modification of the recovery data in the buffer. In some embodiments, the size of each storage block may be 4K.

The sparse LRU queue 110, the dense LRU queue 112, and the switched LRU queue 114 are illustrated first for ease of understanding. In the example in FIG. 1, the storage blocks in the user equipment may be classified into sparse storage blocks and dense storage blocks based on the recovery data cached in the buffer 104, respectively, for caching the recovery data according to different caching methods. For example, in some embodiments, a storage block may be divided into a plurality of storage regions, and the type of the storage block (also known as the cache type) may be classified into a sparse type and a dense type based on the quantity of storage regions in which the recovery data of the storage block in the buffer 104 exists. That is, the type of the storage block may be classified based on the number of regions of the storage block that need to be recovered (also known as the number of recovery regions). For example, in some examples, if the number of regions to be recovered is less than a predetermined threshold (for example, the predetermined threshold may be 384), it indicates that there are a small number of storage regions to be recovered in the storage block, which may be classified as the sparse type at this time. If the number of regions to be recovered is greater than or equal to the predetermined threshold, it indicates that there are many storage regions to be recovered in the storage block, which may be classified as the dense type at this time. Through the classification method in the embodiment, it may be determined whether the storage block needs to recover many regions, and a corresponding caching strategy may be adopted to cache the recovery data. In some embodiments, each region may be measured in a unit of 8 bytes.

In some embodiments, a difference between caching strategies of the sparse storage block and the dense storage block may be: after the storage block is modified under the target recovery request, corresponding recovery data of which storage regions (also known as cache regions) in the storage block are cached in the buffer 104. It is understandable that the recovery data corresponding to a plurality of storage regions in the modified storage block may include both changed data and unchanged data sent after and before processing under the target recovery request. For the convenience of understanding, a specific example is made for example illustration, assuming that the storage block includes two storage regions, A and B, and if data in the storage region A is damaged during a working process, the target recovery request will recover the storage region A to obtain the recovery data of the storage block, and the recovery data includes both the changed data of the storage region A and unchanged data of the storage region B. In the example, the difference between caching strategies of the sparse storage block and the dense storage block may be data of which one of storage region A or B in the recovery data is cached.

In some embodiments, for the sparse storage block, the caching strategy may be caching only the changed data in the recovery region (that is, the recovered region from a plurality of storage regions composing the storage block is used as the cache region). For the dense storage block, the caching strategy may be caching recovery data in all regions (that is, a plurality of storage regions composing the storage block is used as the cache region). Therefore, for the sparse storage block with a small number of regions to be recovered, only the changed data sent may be cached, without the need to cache data in all storage regions. This may improve the spatial efficiency of the buffer 104, and in the actual recovery of the user equipment, there is no need to repeatedly recover data that has not been processed under the target recovery request for the sparse storage block, thereby improving the efficiency of recovery.

Referring to 118 in FIG. 1, 118 shows information associated with the sparse storage block and the dense storage block in the buffer 104, including a content pointer (contentPtr), a bitmap pointer (bitmapPtr), a hash link (hashLink), and an LRU link (auxLink). The content pointer is used for indexing the recovery data of the storage block. The bitmap pointer may be used for identifying the type of storage block. For example, in some embodiments, the bitmap pointer of the sparse storage block may be a pointer pointing to a corresponding bitmap 120. A dense storage block does not require a bitmap, and therefore, its bitmap pointer may be an indicator (also known as a first indicator) indicating the dense type, for example, a one-digit number. The purpose of the bitmap 120 is illustrated below. The hash link may be used as an identity identifier for the storage block, for performing searching based on a hash lookup table during reading and modification. The LRU link may also be used as an identity identifier for the storage block, for determining each storage block when the user submits a recovery confirmation.

Still referring to FIG. 1, for the sparse storage blocks, the changed data of each recovered region may be stored in the form of an entry 122, and the entry 122 is composed of a position index of the corresponding region in the sparse storage block and content of the recovery data. Different entries may be grouped and stored according to a storage unit CB 124. In some embodiments, if each storage region is 8 bytes and the position index is 2 bytes, the capacity of each storage unit 124 may be 64 bytes used for storing 6 entries, that is, each storage unit 124 may be used for storing changed data of 6 recovered regions. For example, in some embodiments, the storage unit 124 may sequentially store the entries 122 in an order of the recovered data being modified. When the number of the entries 122 exceeds the maximum number of entries that can be stored (also known as a pointer threshold condition), that is, the number of modified regions exceeds the maximum number of entries that can be stored, the system 100 may generate a new storage unit 124 for storing the remaining entries corresponding to the modified regions. The advantage of the storage unit 124 having a capacity of 64 bytes is that 64 bytes are the minimum number of operating bytes for most systems, and therefore competition during processing of the storage unit by the system may be avoided.

Figure 2:
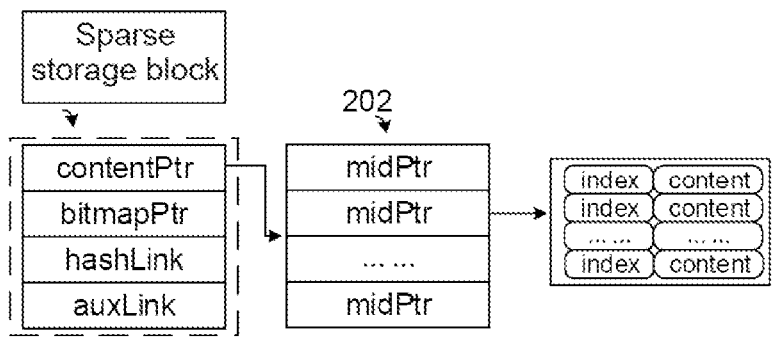
FIG. 2 illustrates a situation of having a plurality of storage units according to some embodiments of the present disclosure.

Referring to FIG. 2, the presence of a plurality of storage units 124 is shown in FIG. 2. In the present embodiment, if there are a plurality of storage units 124, the system 100 may generate a middle pointer (midPtr) 202 pointing to each storage unit 124 to facilitate indexing. A plurality of middle pointers 202 may point to different storage units 124, and the middle pointers 202 perform indexing through the content pointer. When reading or rewriting entries, the correct storage unit 124 may be accessed based on these middle pointers.

Figure 3:
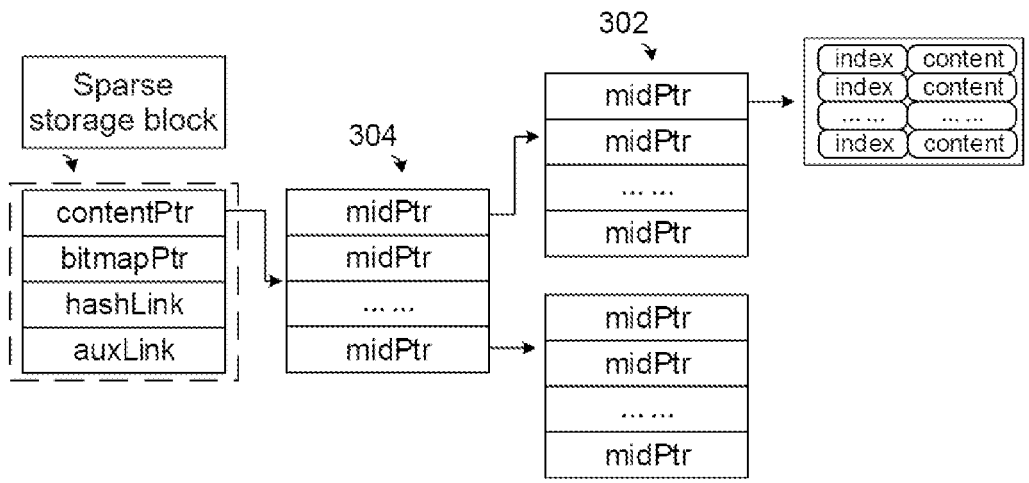
FIG. 3 illustrates a situation of having storage units more than those in FIG. 2 according to some embodiments of the present disclosure.

Referring to FIG. 3, the presence of more storage units 124 than those in FIG. 2 is shown in FIG. 3. In the present embodiment, if the number of storage units 124 exceeds an upper limit of the number that can be indexed by middle pointers in a container (for example, if a container includes 8 middle pointers while the number of storage units 124 is greater than 8), the index may be further refined. For example, in some embodiments, a structure similar to a Btree in FIG. 3 may be used, wherein a middle pointer 302 in a Level-2 container serves as a mediator between a middle pointer 304 in a Level-1 container and the storage unit 124, thereby indexing a large number of storage units 124.

Figure 4:
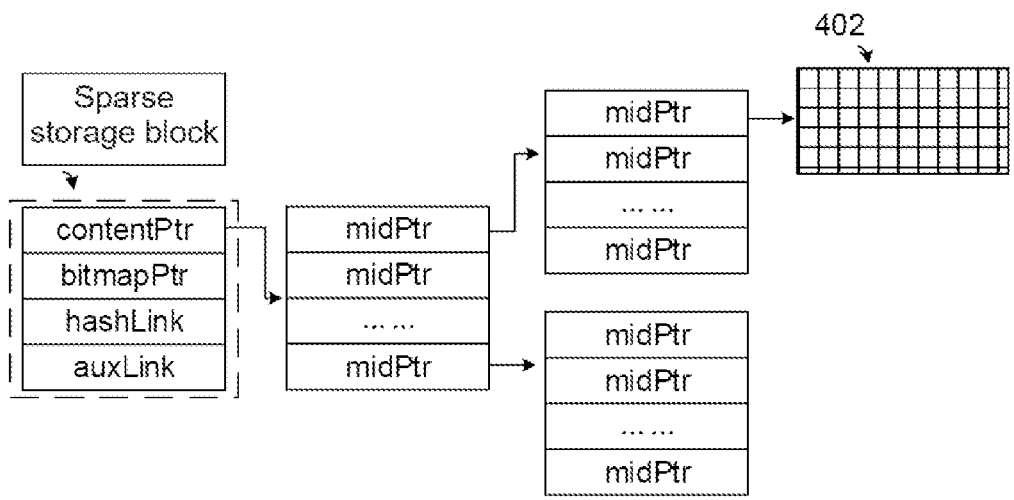
FIG. 4 illustrates a situation where a structure similar to a Btree in FIG. 3 is suitable for a dense storage block according to some embodiments of the present disclosure.

Referring to FIG. 4, a situation of a structure similar to a Btree in FIG. 3 being suitable for a dense storage block is shown in FIG. 4. Recovery data in the dense storage block may also be stored in a storage unit 402, which differs from a sparse storage block in that the storage unit 402 no longer only stores changed data, but also sequentially stores data in all storage regions composing the dense storage block. For example, when the storage unit 402 is the first storage unit corresponding to the dense storage block and is used for storing 64 bytes of data, and each storage region is 8 bytes, it can store data of the first storage region to the eighth storage region in the dense storage block, that is, data from the first byte to the 64th byte, regardless of whether the data is changed data or not. In some embodiments, the storage unit 402 may also have a middle pointer for indexing, which may be obtained specifically with reference to the description of FIG. 2 and FIG. 3 above, and will not be elaborated here.

Next, the bitmap 120 is illustrated. The bitmap 120 is used for indicating data in which storage regions of a plurality of storage regions of a sparse storage block is changed, that is, recovery data in which storage regions of the sparse storage block is cached in the buffer, and for indicating positions of these storage regions, wherein each indicated storage region may represent one bit in the bitmap 120. During a reading process, the bitmap 120 may be used as a bloom filter to quickly display whether a requested read region has changed data. During a modification process, the bitmap 120 may be used as an arbiter to indicate a modified region that needs to be rewritten or added. In addition, the bitmap 120 may further provide the number of modified regions of the sparse storage block to determine the required number of middle pointers for subsequent allocation.

Next, the switched type is illustrated. The switched type may be converted from the sparse type or the dense type when there is a large amount of data in the buffer 104 and after its recovery data is stored in the LUN 106. For example, in some embodiments, if the newly added recovery data corresponds to the sparse storage block, and after the addition, the recovery data cached in the buffer 104 exceeds a throttling threshold (such as 80% of the maximum cached data amount in the buffer 104), in order to guarantee the performance of the buffer 104, the sparse storage block may be converted into a switched storage block, and data that needs to be cached may be determined according to a caching strategy of the dense type, thereby caching the data into the LUN 106.

Returning to FIG. 1 to refer to 126, 126 shows information associated with the switched storage block in the buffer 104, and the information includes a block pointer (blockPtr), a bitmap pointer (bitmapPtr), a hash link (hashLink), and an LRU link (auxLink). The block pointer is used for indexing a block in the LUN 106 that caches the corresponding recovery data. The bitmap pointer may be used for identifying the type of the storage block. For example, in some embodiments, a switched storage block does not require a bitmap, and therefore, its bitmap pointer may be an indicator indicating the switched type (also known as a second indicator). For example, in some embodiments, the bitmap pointer of the switched storage block may be a one-digit number different from the first indicator mentioned above. The hash link may be used as an identity identifier for the storage block, for performing searching based on a hash lookup table during reading and modification, and the indicator for the switched storage block may be queued together with the hash link. The LRU link may also be used as an identity identifier for the storage block, for determining each storage block when the user submits a recovery confirmation.

The information block queue 116 includes a plurality of information storage blocks, and the information storage blocks are used for indicating free storage spaces in the LUN 106. The information associated with the information storage blocks in the buffer 104 is similar to the information associated with the switched storage block in the buffer 104, also including a block pointer (blockPtr), a bitmap pointer (bitmapPtr), a hash link (hashLink), and an LRU link (auxLink). In some embodiments, the block pointer in the information is used for indicating a free storage space block in the LUN 106, and the bitmap pointer may be used for identifying the type of the storage block. For example, in some embodiments, the information storage block does not require a bitmap, and therefore, its bitmap pointer may be an indicator indicating the information storage block. In some embodiments, the indicator of the information storage block may be the same as the indicator of the switched storage block, but the indicator of the information storage block is not queued together with the hash link. When the system 100 confirms that the indicator is the second indicator, the switched storage block and the information storage block may be distinguished based on whether the hash link is a queue. It should be noted that the type of the storage block in the user equipment in the buffer will only be one of the sparse type, the dense type, and the switched type, while the information storage block is only used for indicating the free storage space information of the LUN 106, equivalent to a storage block that exists independently in the buffer 104. The role of information storage blocks is mainly reflected in a conversion process of storage block types.

As can be seen from the descriptions in FIG. 1 to FIG. 4, the method provided in the present disclosure performs caching based on changed data when the number of recovery regions is small, and only retaining the changed data in the buffer 104, resulting in a high memory utilization. Moreover, all memories are organized according to memory units of a cache row, which prevents the system 100 from experiencing memory fragmentation, eliminates the need to maintain a plurality of private pools, and eliminates the need to reserve and waste a large amount of memory for each.

Figure 5:
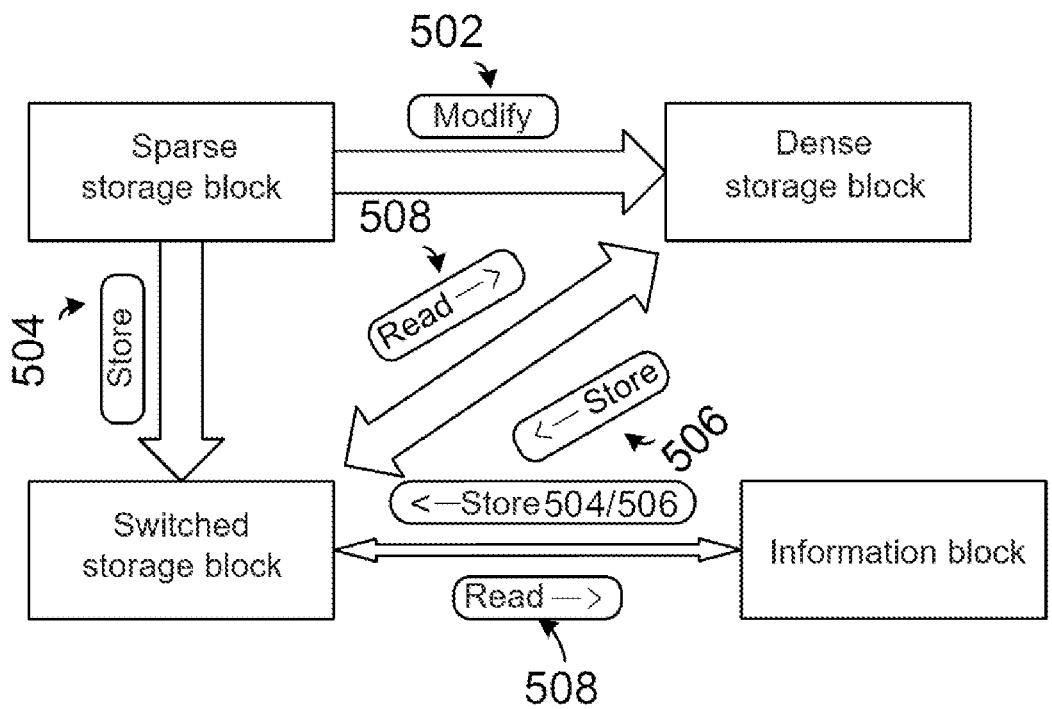
FIG. 5 illustrates a conversion process of a storage block type according to some embodiments of the present disclosure.

Referring to FIG. 5, the conversion process of the storage block types is shown in FIG. 5. For the sparse storage block, in a process of modifying 502, it may be converted into a dense storage block when the modified regions exceed a predetermined threshold, and in a process of caching 504 the recovery data, it may be converted into a switched storage block in response to the total amount of data in the buffer after caching exceeding the throttling threshold. In the conversion process, the system 100 determines an information storage block according to an order of an information block LRU 116, and caches, based on a free storage space block of the LUN indicated by the information storage block, the recovery data into the LUN 106 according to the method described above, so that the LUN is dense and achieves the maximum utilization. For the dense storage block, in the process of caching 506 the recovery data, it may be converted to the switched storage block in response to the total amount of data in the buffer after caching exceeding the throttling threshold. In the conversion process, the system 100 determines an information storage block according to the order of the information block LRU 116, and caches, based on the free storage space block of the LUN indicated by the information storage block, the recovery data into the LUN 106, so that the LUN is dense and achieves the maximum utilization. For the switched storage block, in a reading 508 process, it may be recovered to a readable dense storage block by acquiring the cached recovery data from the LUN 106. At the same time, due to the occurrence of a free storage space block in the LUN 106 after the conversion, the system 100 may generate an information storage block indicating the storage space block.

In some embodiments, the data of the switched storage block is cached in the LUN 106, although data overflow issues in the buffer 104 may be avoided, it will take more time and resources to read, modify, and process the switched storage block, and therefore, the system 100 may determine whether the sparse storage block and/or dense storage block needs to be converted into the switched storage block according to different conversion strategies in different situations. In some embodiments, the conversion strategy may be a memory priority strategy or a switching priority strategy. When memory resources are sufficient, the system 100 may implement the memory priority strategy, for prioritizing the performance and avoiding switching as much as possible. In a case of limited memory resources, the system 100 may implement the switching priority strategy to avoid memory allocation as much as possible.

Figure 6:
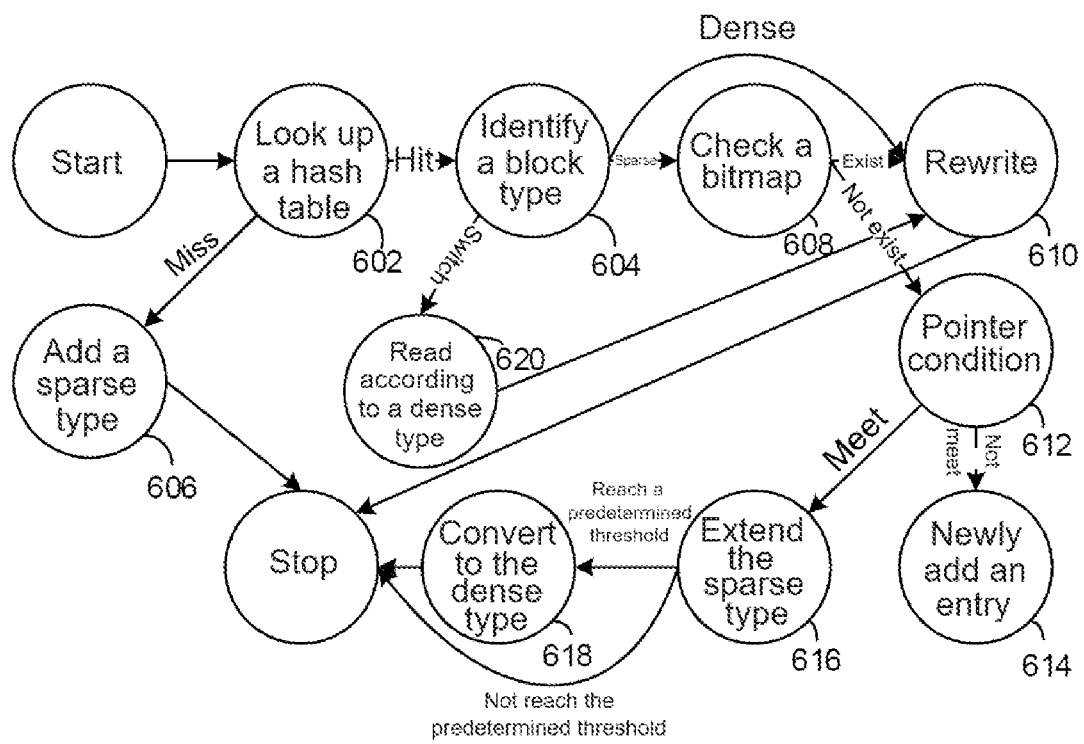
FIG. 6 and FIG. 7 respectively illustrate performing processes of performing a memory priority strategy and a switching priority strategy during a modification process according to some embodiments of the present disclosure.
Figure 7:
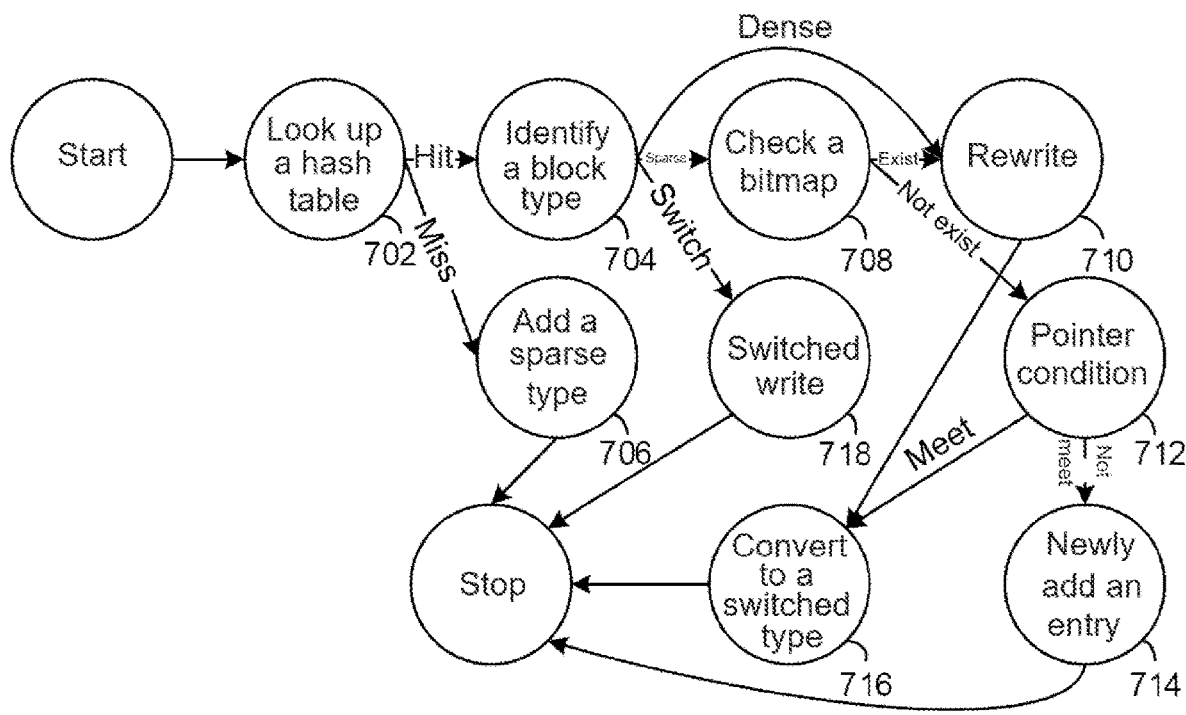

Referring to FIG. 6 and FIG. 7, FIG. 6 and FIG. 7 respectively illustrate performing processes of the system 100 performing the memory priority strategy and the switching priority strategy during the modification process. Referring to FIG. 6, under the memory priority strategy, after the system 100 repairs the data of the storage block, it first looks up 602 a hash table, and if it can hit, it indicates that the recovery data of the storage block has already been cached in the buffer 104. At this point, a block type of the storage block may be identified 604. In some embodiments, the block type of the storage block may be determined based on the bitmap pointer information. If it is a miss, the recovery data of the storage block may be cached 606 according to the sparse type in the buffer 104, and the procedure ends. If the block type of the storage block is identified as the sparse type, it may be checked 608 whether the recovery data of the corresponding storage region has been cached in the bitmap. If it exists, rewriting 610 may be performed directly. If it does not exist, it may be determined 612 whether the number of entries meets a pointer condition. If the condition is not met, an entry may be added 614, and if the condition is met, the sparse type may be extended 616, for example, a middle pointer may be generated. If the newly added recovery data causes the number of modified storage regions in the storage block to reach a predetermined threshold, the storage block may be converted into a dense type 618, and the procedure ends. If the block types of the storage blocks after identification are the dense type and the switched type 620, rewriting 610 may be performed directly.

Referring to FIG. 7, under the switching priority strategy, after the system 100 repairs the data of the storage block, it first looks up 702 a hash table, and if it can hit, it indicates that the recovery data of the storage block has already been cached in the buffer 104. At this point, a block type of the storage block may be identified 704. In some embodiments, the block type of the storage block may be determined based on the bitmap pointer information. If it is a miss, the recovery data of the storage block may be cached 706 according to the sparse type in the buffer 104, and the procedure ends. If the block type of the storage block is identified as the sparse type, it may be checked 708 whether the recovery data of the corresponding storage region has been cached in the bitmap. If it exists, rewriting 710 may be performed directly. If it does not exist, it may be determined 712 whether the number of entries meets a pointer condition. If the condition is not met, an entry may be added 714, and if the condition is met, different from FIG. 6, the sparse type may be converted to the switched type 716. If the block type of the storage block after identification is the dense type, rewriting 710 may be performed directly. If the block type of the storage block is the switched type after identification, the newly added recovery data may be switched and written 718 to the LUN 106. It should be noted that although not shown in FIG. 6 and FIG. 7, if the hash misses, some memory is still needed to mark the presence of the repair in the hash. Therefore, there may be a throttling mechanism that refreshes some dense/sparse storage blocks (following the dense/sparse LRU) to the switched type and acquires some available memory.

Figure 8:
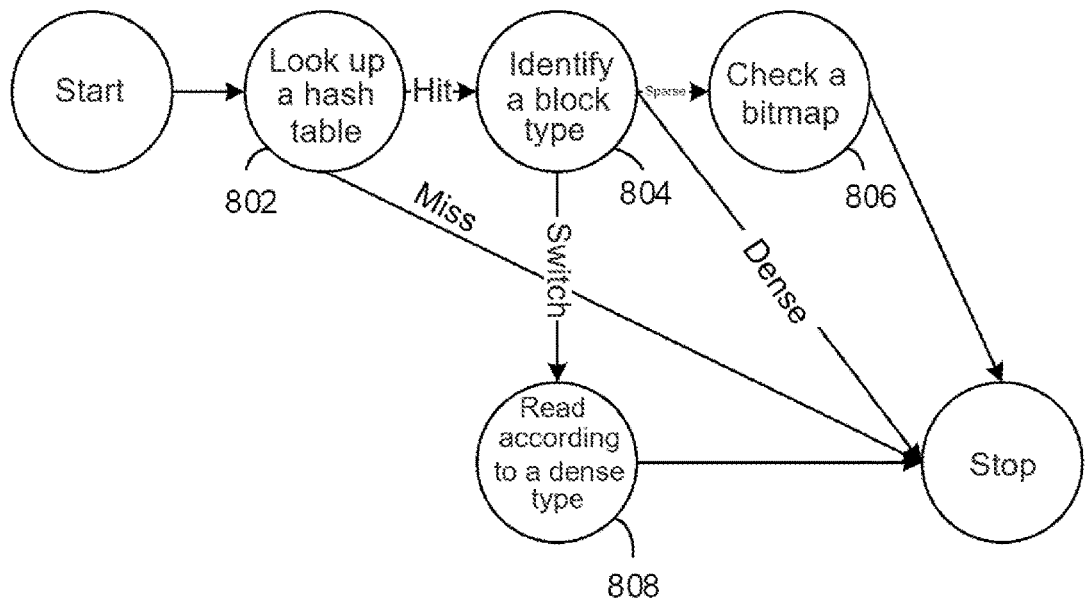
FIG. 8 and FIG. 9 respectively illustrate performing processes of performing a memory priority strategy and a switching priority strategy during a reading process according to some embodiments of the present disclosure.
Figure 9:
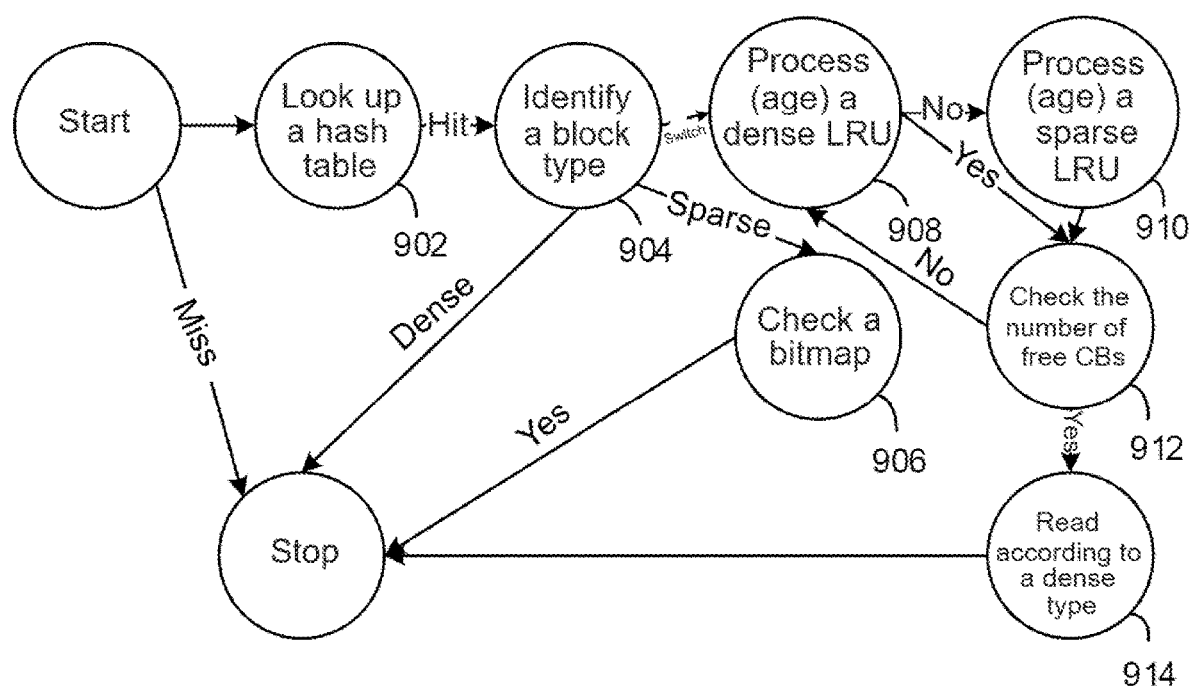

Referring to FIG. 8 and FIG. 9, FIG. 8 and FIG. 9 respectively illustrate performing processes of the system 100 performing the memory priority strategy and the switching priority strategy during the reading process. Referring to FIG. 8, under the memory priority strategy, it first looks up 802 a hash table, and if it can hit, it indicates that the recovery data of the storage block has already been cached in the buffer 104. At this point, a block type of the storage block may be identified 804. In some embodiments, the block type of the storage block may be determined based on the bitmap pointer information. If it is a miss, reading the storage block may be stopped. If the block type of the storage block is identified as the sparse type, the bitmap may be checked 806, and the function of the above filter may be achieved based on the bitmap to quickly display whether the requested read region has changed (if no read region is displayed in the bitmap, a read interface may return a result of "None"). If the identified block types of the storage blocks are the dense type and the switched type 808, these storage blocks may be directly read.

Referring to FIG. 9, under the switching priority strategy, it first looks up 902 a hash table, and if it can hit, it indicates that the recovery data of the storage block has already been cached in the buffer 104. At this point, a block type of the storage block may be identified 904. In some embodiments, the block type of the storage block may be determined based on the bitmap pointer information. If it is a miss, reading the storage block may be stopped. If the block type of the storage block is identified as the sparse type, the bitmap may be checked 906, and the function of the above filter may be achieved based on the bitmap to quickly display whether the requested read region has changed. If the identified block types of the storage blocks are the dense type, these storage blocks may be directly read. If the block type of the storage block is identified as the switched type, it is not necessary for the modifying process, the dense LRU and the sparse LRU may be first processed 908, 910 (this process may be called age), for example, the sparse storage block and the dense storage block are converted into the switched type. The number of free storage units CBs is checked 912, and when the number of free storage units CBs in the buffer 104 reaches a certain value, it is determined that sufficient CBs have been collected to read the switched storage block, and then the storage block is read 914 according to the dense type.

When the user confirms the recovery, that is, after performing a submit operation, it only needs to refresh the dense LRU, the sparse LRU, and the switched LRU, respectively, to the user equipment in the order instructed by the LRUs. Due to the fact that LRUs are structured according to a kernel, a load between the kernels is natively balanced when processing the refresh task. In addition, in the present disclosure, the LRU operations are performed online simultaneously with modification and reading interfaces. The program will identify an LRU transmission source and destination, and convert them at the end of each interface. Although the LRUs are structured according to the kernel, the operations still need to maintain LRU locking, as the age operation may involve a cross kernel LRU operation. Therefore, a lock sequence of the dense LRU, the sparse LRU, and the switched LRU may be followed to prevent deadlocks.

Figure 10:
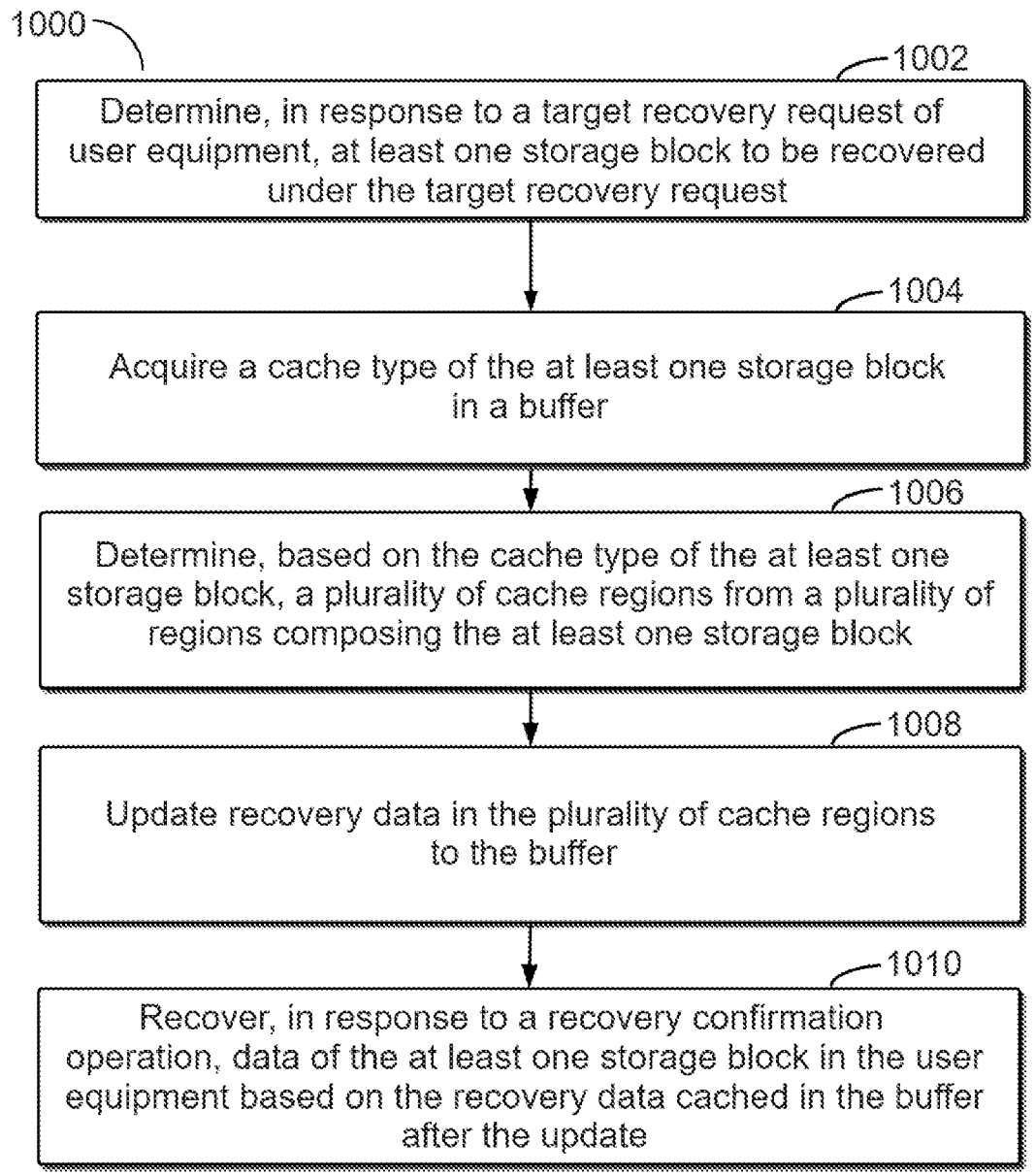
FIG. 10 illustrates a flow chart of a method for recovering data according to some embodiments of the present disclosure.

For ease of understanding, FIG. 10 further provides a method for recovering data. At a block 1002, in response to a target recovery request of user equipment, at least one storage block to be recovered under the target recovery request is determined. The at least one storage block is composed of a plurality of storage regions. In some embodiments, each storage block may be 4K, and each storage region may be 8 bytes.

At a block 1004, a cache type of the at least one storage block in the buffer is acquired. The cache type of the at least one storage block is based on the number of recovery regions indicated by the buffer for the at least one storage block. In some embodiments, the cache type may be determined based on a bitmap pointer. For example, when the bitmap pointer is a pointer pointing to a bitmap, it may be determined that the storage block is of the sparse type. When the bitmap pointer is an indicator corresponding to the dense type, it may be determined that the storage block is of the dense type. When the bitmap pointer is an indicator corresponding to the switched type, it may be determined that the storage block is of the switched type. In some embodiments, the cache type of the buffer may be used for indicating the number of storage regions in which the recovery data in the buffer exists, that is, the number of regions that need to be recovered for the storage block. For example, in some examples, if the number of regions that need to be recovered is less than a predetermined threshold (for example, the predetermined threshold may be 384), it indicates that there are a small number of storage regions that need to be recovered in the storage block. At this point, it may be classified as a sparse storage block in the sparse LRU 110. However, if the number of regions that need to be recovered is greater than or equal to the predetermined threshold, it indicates that there are many storage regions that need to be recovered in the storage block. At this point, it may be classified into a dense storage block in the dense LRU 112. By using this classification method, it can be determined whether the storage block needs to recover many regions, so as to adopt a corresponding caching strategy to cache the recovery data. In some embodiments, the cache type can also be the switched type.

At a block 1006, a plurality of cache regions are determined from a plurality of regions composing the at least one storage block based on the cache type of the at least one storage block. Moreover, at a block 1008, the recovery data in the plurality of cache regions is updated to the buffer. In some embodiments, if the cache type is the sparse type, only the recovery region may be determined as the cache region, that is, data in the recovery region that has changed compared with data before recovery may be cached in the buffer 104. If the cache type is the dense type, only all storage regions composing the storage block may be determined as cache regions, that is, regardless of whether they are modified during recovery, the data may be cached in the buffer 104. If the cache type is the switched type, the caching strategy is similar to that of the dense type, except that the cached recovery data needs to be cached in the LUN 106. In some embodiments, the buffer 104 may include an information storage block used for indicating a free storage space in the LUN. When the recovery data volume after the update exceeds a throttling threshold of the buffer 104, the buffer 104 may obtain, through the information storage block, information indicating the free storage space required during the cache type conversion process, and convert the sparse storage block and/or dense storage block to the switched type.

In some embodiments, there is a position bitmap associated with the at least one storage block in the buffer, and the position bitmap is used for indicating positions of the recovery regions of the at least one storage block in the at least one storage block. During updating, the bitmap may also be used for indicating whether the cache region is a recovery region, and if it is, a corresponding entry in a storage unit 124 may be directly rewritten. If not, it is necessary to newly add an entry for the cache region in the storage unit 124. In some embodiments, the entry includes a position index of the corresponding cache region in the storage block and a recovery data content of the corresponding cache region. For the situation of new addition, in some embodiments, if the number of recovery regions indicated for the at least one storage block by the buffer before addition reaches a pointer threshold condition, it indicates that the current number of storage units 124 is large and middle pointers need to be generated to index different storage units. In some embodiments, if the number of recovery regions after the update is large, such as greater than or equal to the predetermined threshold for identifying the cache type, and the cache type of the storage block is the sparse type, it indicates that the number of regions that need to be recovered after the update is large, and the cache type of the storage block may be converted to the dense type.

At a block 1010, in response to a recovery confirmation operation, the data of the at least one storage block in the user equipment is recovered based on the recovery data cached in the buffer after the update. If it is determined that the user has performed the recovery confirmation operation, a dense LRU, a sparse LRU, and a switched LRU may be refreshed to the user equipment respectively in an order guided by the LRUs to complete data recovery. By using the method provided in FIG. 10, recovery may be performed after user confirmation, and the memory and space efficiency in the buffer can be improved to the maximum extent, thereby providing a good user experience.

According to the various embodiments and their combination embodiments of the present disclosure described above, the efficiency of configuring function states can be improved. It should be understood that the implementations shown in FIG. 1 to FIG. 10 above are only schematic. According to practical applications, the architecture or processes shown in FIG. 1 to FIG. 10 may have other different forms and may further include more or fewer one or a plurality of functional modules and/or units, and the modules and/or units may be partially or completely implemented as hardware modules, software modules, firmware modules, or any combination thereof, which is not limited in the embodiments of the present disclosure.

It can be understood that the specific names and/or protocols of the various components of the system described herein are intended only to help those skilled in the art better understand the ideas of the present disclosure and are not intended to limit the scope of the present disclosure in any way. Further, in other embodiments, more or better components may be included, as well as alternative components having the same or similar functions.

Figure 11:
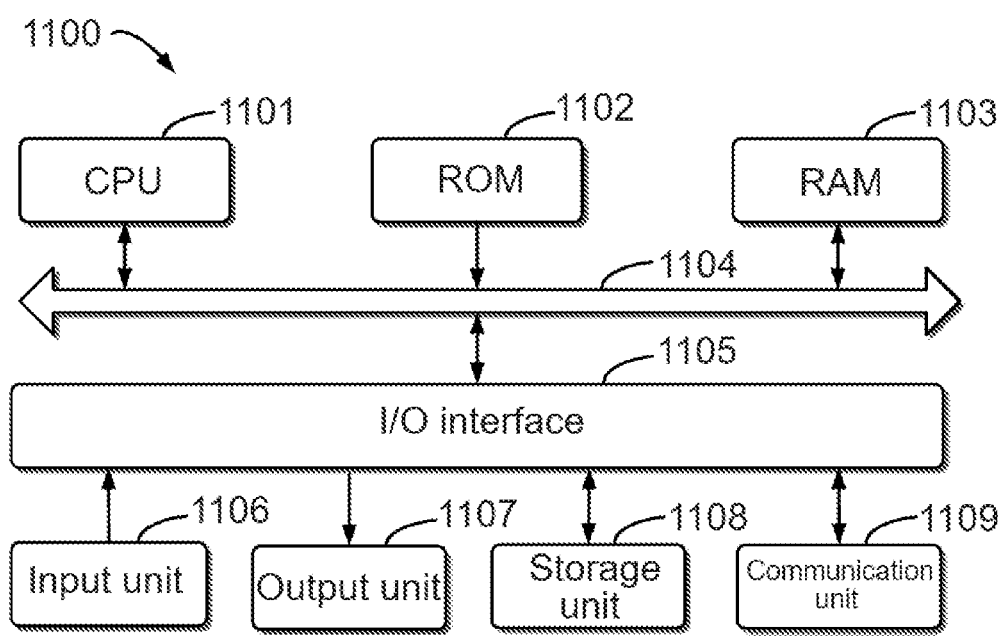
FIG. 11 illustrates a schematic structural diagram of a device that can be used for implementing the embodiments of the present disclosure.

FIG. 11 illustrates a schematic structural diagram of an example device 1100 that can be used to implement some embodiments according to the present disclosure. The device 1100 may be implemented as a server, a PC, or the like, and the specific implementation type of the device 1100 is not limited in the embodiments of the present disclosure. As shown in the FIG. 11, the device 1100 includes a central processing unit (CPU) 1101 that may perform various appropriate actions and processing according to computer program instructions stored in a read-only memory (ROM) 1102 or computer program instructions loaded from a storage unit 1108 to a random access memory (RAM) 1103. Various programs and data required for the operation of the device 1100 may also be stored in the RAM 1103. The CPU 1101, the ROM 1102, and the RAM 1103 are connected to each other through a bus 1104. An input/output (I/O) interface 1105 is also connected to the bus 1104.

A plurality of components in the device 1100 are connected to the I/O interface 1105, including: an input unit 1106, such as a keyboard and a mouse; an output unit 1107, such as various types of displays and speakers; a storage unit 1108, such as a magnetic disk and an optical disc; and a communication unit 1109, such as a network card, a modem, and a wireless communication transceiver. The communication unit 1109 allows the device 1100 to exchange information/data with other devices through a computer network such as the Internet and/or various telecommunication networks.

The processing unit 1101 may perform the methods and/or processing as described above, for example, the method shown in FIG. 10. For example, in some embodiments, the method may be implemented as a computer software program that is tangibly included in a machine-readable medium, such as the storage unit 1108. In some embodiments, part or all of the computer program may be loaded and/or mounted to the device 1100 via the ROM 1102 and/or the communication unit 1109. One or more steps of the methods described above may be performed when the computer program is loaded into the RAM 1103 and executed by the CPU 1101. Alternatively, in other embodiments, the CPU 1101 may be configured to perform the method in any other appropriate manner (such as by means of firmware).

The functions described herein above may be performed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

In some embodiments, the methods and processes described above may be implemented as a computer program product. The computer program product may include a computer-readable storage medium on which computer-readable program instructions for performing various aspects of the present disclosure are loaded.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams. The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

In the information of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combinations thereof.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two successive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a special-purpose hardware-based system that executes specified functions or actions, or using a combination of special-purpose hardware and computer instructions.

Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the information of separate embodiments may also be implemented in combination in a single implementation. Conversely, various features that are described in the information of a single implementation may also be implemented in a plurality of implementations separately or in any suitable sub-combination.

Although the present subject matter has been described using a language specific to structural features and/or method logical actions, it should be understood that the subject matter recited in the appended claims is not necessarily limited to the particular features or actions described above. Rather, the specific features and actions described above are merely example forms of implementing (or supporting) the claims.

The embodiments of the present disclosure have been described above. The foregoing description is illustrative rather than exhaustive, and is not limited to the embodiments disclosed. Numerous recoveries and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other people of ordinary skill in the art to understand the various embodiments disclosed herein.

The invention claimed is:

1. A method for recovering data, comprising:
   determining, in response to a target recovery request of user equipment, at least one storage block to be recovered under the target recovery request, wherein the at least one storage block is composed of a plurality of storage regions;
   acquiring a cache type of the at least one storage block in a buffer, wherein the cache type of the at least one storage block is based on the number of recovery regions indicated by the buffer for the at least one storage block;
   determining, based on the cache type of the at least one storage block, a plurality of cache regions from a plurality of regions composing the at least one storage block;
   updating recovery data in the plurality of cache regions to the buffer; and
   recovering, in response to a recovery confirmation operation, data of the at least one storage block in the user equipment based on the recovery data cached in the buffer after the update.

2. The method according to claim 1, wherein the cache type of the at least one storage block is at least one of a sparse type and a dense type, the sparse type indicates that the number of recovery regions indicated by the buffer for the at least one storage block is less than a predetermined threshold, and the dense type indicates that the number of recovery regions indicated by the buffer for the at least one storage block is greater than or equal to the predetermined threshold.

3. The method according to claim 2, wherein determining the plurality of cache regions from the plurality of storage regions composing the at least one storage block comprises:
   determining, in response to the cache type of the at least one storage block being the sparse type, a plurality of cache regions recovered under the target recovery request from the plurality of storage regions composing the at least one storage block.

4. The method according to claim 3, wherein there is a position bitmap associated with the at least one storage block in the buffer, and the position bitmap is used for indicating positions of the recovery regions of the at least one storage block in the at least one storage block.

5. The method according to claim 4, wherein updating the recovery data of the plurality of cache regions to the buffer comprises:
   querying the position bitmap associated with the at least one storage block to determine whether the plurality of cache regions are recovery regions;
   rewriting, in response to the plurality of cache regions being recovery regions, the recovery data of the plurality of cache regions which already exists in the buffer with the recovery data of the plurality of cache regions after the recovery under the target recovery request; or
   adding, in response to the plurality of cache regions not being recovery regions, the recovery data of the plurality of cache regions after the recovery under the target recovery request to the buffer region by region.

6. The method according to claim 5, further comprising:
   updating, in response to the plurality of cache regions not being recovery regions, the number of recovery regions of the at least one storage block with the number of regions of the plurality of cache regions; and
   converting, in response to the updated number of recovery regions being greater than or equal to the predetermined threshold, the cache type of the at least one storage block from the sparse type to the dense type.

7. The method according to claim 5, further comprising:
   generating, in response to the number of recovery regions indicated by the buffer for the at least one storage block before addition reaching a pointer threshold condition, a first middle pointer for indexing the plurality of cache regions and a second middle pointer for indexing corresponding recovery regions corresponding to the number of recovery regions after the addition.

8. The method according to claim 3, wherein the recovery data of each cache region is associated with a position index of the each cache region in the at least one storage block.

9. The method according to claim 2, wherein determining the plurality of cache regions from the plurality of storage regions composing the at least one storage block further comprises:
determining, in response to the cache type of the at least one storage block being the dense type, the plurality of storage regions composing the at least one storage block as a plurality of cache regions of the at least one storage block.

10. The method according to claim 1, wherein the cache type of the storage block is further capable of being a switched type, and the method further comprises:
converting, in response to the total data volume after the update exceeding a throttling threshold of the buffer, the cache type of the at least one storage block to the switched type; and
caching recovery data in the plurality of regions composing the at least one storage block in an independent logical unit associated with the buffer.

11. The method according to claim 10, wherein the buffer further comprises an information storage block for indicating a free storage space in the independent logical unit.

12. The method according to claim 1, wherein the type of the at least one storage block is one of the sparse type, the dense type, and the switched type, and acquiring the cache type of the at least one storage block comprises:
determining that the cache type of the at least one storage block is the sparse type in response to the presence of the position bitmap associated with the at least one storage block in the buffer;
determining that the cache type of the at least one storage block is the dense type in response to the absence of the position bitmap associated with the at least one storage block in the buffer and the presence of a first indicator associated with the at least one storage block in the buffer; or
determining that the cache type of the at least one storage block is the switched type in response to the absence of the position bitmap associated with the at least one storage block in the buffer and the presence of a second indicator associated with the at least one storage block in the buffer.

13. An electronic device, comprising:
a processor; and
a memory coupled to the processor and having instructions stored therein, wherein the instructions, when executed by the processor, cause the electronic device to perform operations comprising:
determining, in response to a target recovery request of user equipment, at least one storage block to be recovered under the target recovery request, wherein the at least one storage block is composed of a plurality of storage regions;
acquiring a cache type of the at least one storage block in a buffer, wherein the cache type of the at least one storage block is based on the number of recovery regions indicated by the buffer for the at least one storage block;
determining, based on the cache type of the at least one storage block, a plurality of cache regions from a plurality of regions composing the at least one storage block;
updating recovery data in the plurality of cache regions to the buffer; and
recovering, in response to a recovery confirmation operation, data of the at least one storage block in the user equipment based on the recovery data cached in the buffer after the update.

14. The electronic device according to claim 13, wherein the cache type of the at least one storage block is at least one of a sparse type and a dense type, the sparse type indicates that the number of recovery regions indicated by the buffer for the at least one storage block is less than a predetermined threshold, and the dense type indicates that the number of recovery regions indicated by the buffer for the at least one storage block is greater than or equal to the predetermined threshold.

15. The electronic device according to claim 14, wherein determining the plurality of cache regions from the plurality of storage regions composing the at least one storage block comprises:
determining, in response to the cache type of the at least one storage block being the sparse type, a plurality of cache regions recovered under the target recovery request from the plurality of storage regions composing the at least one storage block.

16. The electronic device according to claim 15, wherein there is a position bitmap associated with the at least one storage block in the buffer, and the position bitmap is used for indicating positions of the recovery regions of the at least one storage block in the at least one storage block.

17. The electronic device according to claim 16, wherein updating the recovery data of the plurality of cache regions to the buffer comprises:
querying the position bitmap associated with the at least one storage block to determine whether the plurality of cache regions are recovery regions;
rewriting, in response to the plurality of cache regions being recovery regions, the recovery data of the plurality of cache regions which already exists in the buffer with the recovery data of the plurality of cache regions after the recovery under the target recovery request; or
adding, in response to the plurality of cache regions not being recovery regions, the recovery data of the plurality of cache regions after the recovery under the target recovery request to the buffer region by region.

18. The electronic device according to claim 17, the operations further comprising:
updating, in response to the plurality of cache regions not being recovery regions, the number of recovery regions of the at least one storage block with the number of regions of the plurality of cache regions; and
converting, in response to the updated number of recovery regions being greater than or equal to the predetermined threshold, the cache type of the at least one storage block from the sparse type to the dense type.

19. The electronic device according to claim 17, the operations further comprising:
generating, in response to the number of recovery regions indicated by the buffer for the at least one storage block before addition reaching a pointer threshold condition, a first middle pointer for indexing the plurality of cache regions and a second middle pointer for indexing corresponding recovery regions corresponding to the number of recovery regions after the addition.

20. A computer program product having a non-transitory computer readable medium which stores a set of instructions to recover data; the set of instructions, when carried out by computerized circuitry, causing the computerized circuitry to perform a method of:

determining, in response to a target recovery request of user equipment, at least one storage block to be recovered under the target recovery request, wherein the at least one storage block is composed of a plurality of storage regions;

acquiring a cache type of the at least one storage block in a buffer, wherein the cache type of the at least one storage block is based on the number of recovery regions indicated by the buffer for the at least one storage block;

determining, based on the cache type of the at least one storage block, a plurality of cache regions from a plurality of regions composing the at least one storage block;

updating recovery data in the plurality of cache regions to the buffer; and recovering, in response to a recovery confirmation operation, data of the at least one storage block in the user equipment based on the recovery data cached in the buffer after the update.

* * * * *